(12) United States Patent
Robson et al.

(10) Patent No.: US 6,641,467 B1
(45) Date of Patent: *Nov. 4, 2003

(54) POWER TOOL

(75) Inventors: Nigel Robson, Newton Hall (GB); Brian Wadge, Co Durham (GB)

(73) Assignee: Black & Decker Inc., Newark, DE (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 250 days.

(21) Appl. No.: 09/245,663

(22) Filed: Feb. 8, 1999

(30) Foreign Application Priority Data

Feb. 7, 1998 (GB) .............................................. 9802587

(51) Int. Cl.⁷ .............................................. B24B 47/02
(52) U.S. Cl. ........................ 451/334; 451/363; 451/415; 30/500; 30/DIG. 1; 408/20; 408/22; 408/31
(58) Field of Search .................................. 451/344, 363, 451/415; 30/500, DIG. 1; 408/20, 22, 31

(56) References Cited

U.S. PATENT DOCUMENTS

| 3,724,237 A | * | 4/1973 | Wood ........................... 173/29 |
| 3,759,336 A | * | 9/1973 | Marcovitz et al. ........... 173/170 |
| 4,103,511 A |   | 8/1978 | Kress et al. |
| 4,317,282 A | * | 3/1982 | Pace ............................. 30/500 |
| 4,685,625 A | * | 8/1987 | Mazza .......................... 241/36 |
| 4,924,578 A | * | 5/1990 | Chagnon et al. .............. 30/500 |
| 4,976,173 A | * | 12/1990 | Yang ............................ 173/46 |
| 5,033,552 A | * | 7/1991 | Hu ............................... 173/170 |
| 5,511,912 A | * | 4/1996 | Ellerbrock .................... 30/500 |
| D420,267 S |   | 2/2000 | Robson ......................... D8/61 |
| 6,170,579 B1 |   | 1/2001 | Wadge ......................... 173/216 |
| 6,176,322 B1 |   | 1/2001 | Wadge ......................... 173/217 |
| 6,206,107 B1 |   | 3/2001 | Wadge ......................... 173/217 |

FOREIGN PATENT DOCUMENTS

| GB | 914377 | 1/1963 |
| GB | 1143677 | 2/1969 |

* cited by examiner

Primary Examiner—M. Rachuba
(74) Attorney, Agent, or Firm—Harness, Dickey & Pierce, P.L.C.

(57) ABSTRACT

A power tool (2) includes a motor (22) pivotally mounted within the housing of the tool. The tool is able to accept any one of a plurality of attachment members (44, 46, 48).

20 Claims, 5 Drawing Sheets

POWER TOOL

The present invention relates to a power tool and has particular although not exclusive, relevance to battery powered tools.

It is conventional for power tools to be designed and built for a dedicated purpose, such as a drill, a jigsaw or a sander. If the user needs to undertake a sanding operation he will use a dedicated sander. If then he needs to drill a hole in a workpiece he will swap the sander for a dedicated drill, and so on.

Whilst such swapping over of dedicated tools is not inconvenient, it does mean that, particularly for the person who needs to use power tools relatively infrequently, considerable expense is incurred in acquiring a broad range of these dedicated power tools.

Furthermore, in the case of so-called "cordless" or battery-powered tools, the user will either need to change the battery pack when changing dedicated tools, or have several ready-charged batteries available for use. These alternative options are cumbersome or expensive respectively.

Solutions to the above problems have been proposed in the past and one such solution entails providing a power tool including a motorised drive which is capable of accepting any one of a plurality of discrete heads which achieve a dedicated purpose. This means that rather than purchasing a dedicated entire power tool for each job, the user only has to purchase a dedicated head (which is cheaper than a dedicated entire tool) and just swap these over as and when necessary.

There still exist certain problems with such solutions, however. In a system such as the discrete heads described above, it is important to ensure a sufficiently secure and rigid attachment between the power tool and the dedicated head. While it is of course necessary to provide a sufficiently secure attachment for all heads, it is particularly important to do so where the nature of the work for which the assembled tool is to be used is likely to generate high forces, in particular relatively high bending and twisting forces between the power tool and the head.

It is an object of the present invention to provide a power tool in which the above disadvantages are reduced or substantially obviated.

The present invention provides a power tool including a body portion defining a handle and a motor mounted within the body portion, which motor is arranged to drive an output spindle of the tool; the body portion further defining an opening around the output spindle, which opening accepts any one of a plurality of attachment heads presented thereto, the power tool characterised in that there is an interface between the body portion of the power tool and the attachment head, and this interface is shaped so that the attachment head is supported in three dimensions.

In a preferred embodiment of a tool according to the invention, the interface between the body portion and the attachment head comprises a first linear section remote from the handle and a second cylindrical section adjacent to the handle.

The linear/cylindrical interface gives added stability as the applied force from the operator's hand acts through the curved intersection. Further, the cupped nature of the intersection provides additional support to any torque reactions when the tool is in operation, for example as either a drill, driver, saw or sander mechanism.

The present invention will now be described, by way of example only and with reference to the accompanying drawings, of which:

Figure 1:
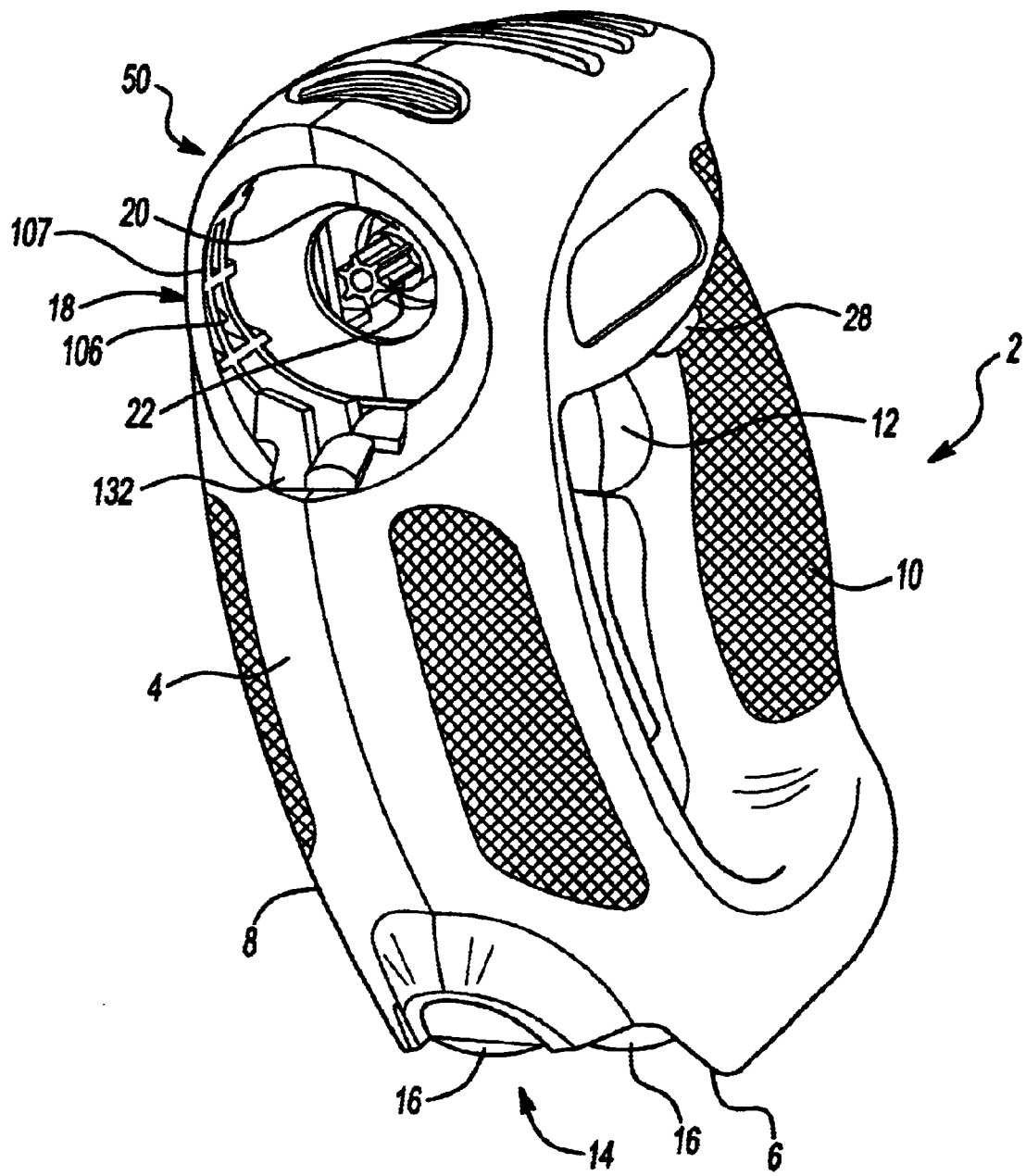
FIG. 1 shows a front perspective view of a body portion of a power tool in accordance with the present invention.
Figure 2:
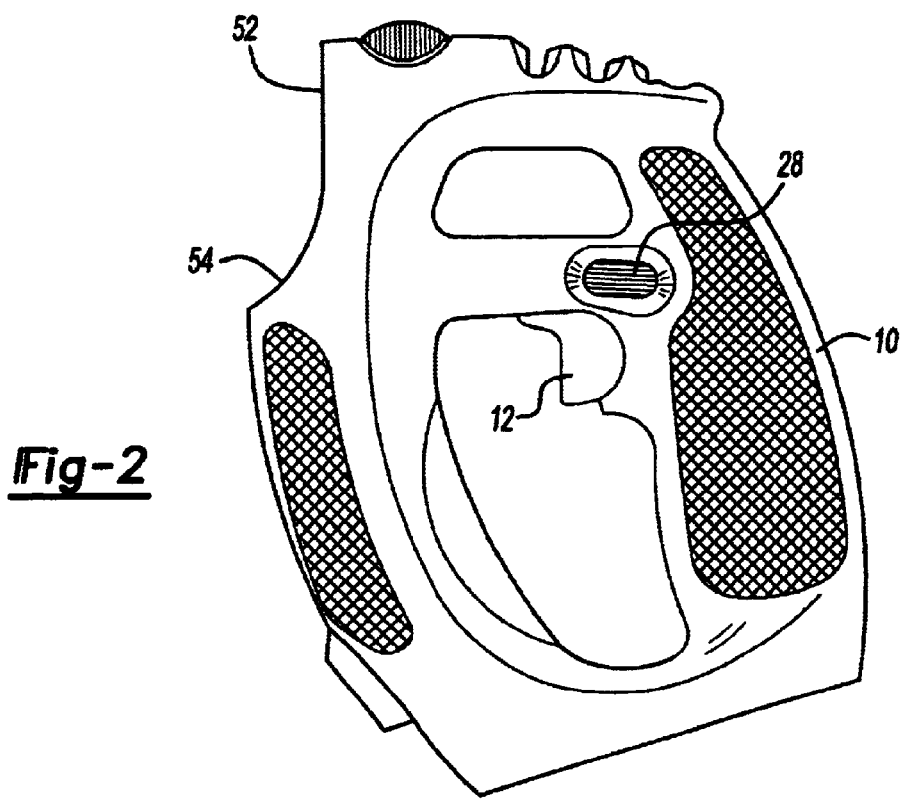
FIG. 2 shows a side view of the body portion of FIG. 1 without an attached head.

Referring first to FIGS. 1 and 2, a power tool shown generally as (2) includes a body portion (4) formed from two halves of a plastics clamshell. The two halves (6, 8) co-operate together to encapsulate the internal mechanisms of the power tool, which will be described here below. The body portion (4) defines a handle (10) which in use of the tool (2) is grasped by the user. The handle (10) is so shaped to provide the user with easy access to an actuating trigger (12) in the form of a pistol grip, which is conventional in the art of power tools. The body portion (4) is formed from the two halves of clamshell (6, 8) also to define an opening shown generally as (14), through which batteries (16) for powering the tool may pass. Those skilled in the art will appreciate that the choice of batteries for powering the tool (2) depends upon the work which the tool is required to undertake. The batteries per se form no part of the present invention and so will not be described in any more detail herein.

At the opposite end of the body portion (4) from the battery opening (14) the two halves of the clamshell (6, 8) define an opening (18) through which an output spindle (20) of a motor (not shown) housed within the body portion (4) is mounted.

A pair of batteries (16) have been passed through the battery opening (14) and are electrically coupled via terminals and a switch operable by the trigger (12) to the motor. The batteries (16) are retained within their opening (14) by a detent mechanism which can be manually operated in order to allow removal of the batteries (16) from the body portion (4).

The motor is selectively coupled to the batteries (16) via the switch in conventional manner. On activation of the trigger (12) the user selectively couples the motor to the battery (16) thereby energising the motor which in turn provides a rotational force upon the output spindle (20).

As is conventional in the art of power tools the motor is provided with a forward/reverse switch (28) the operation of which determines the sense of rotation of the output spindle (20).

Figure 3:
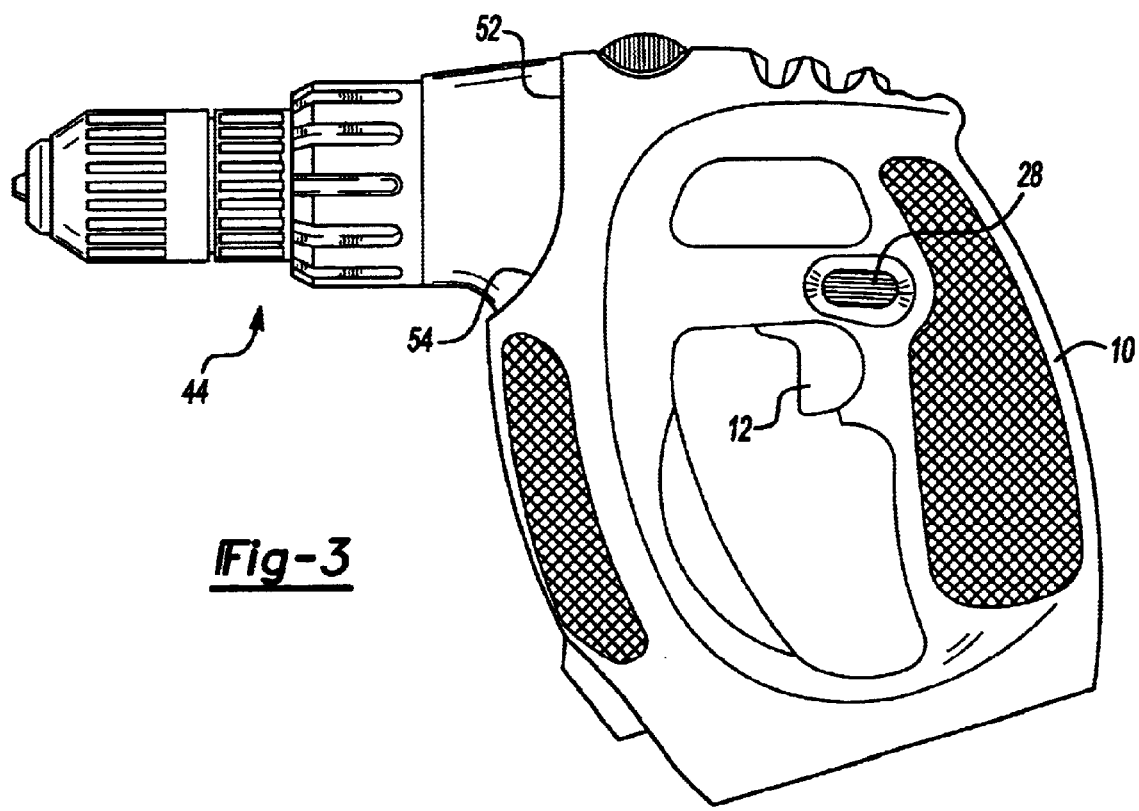
FIG. 3 shows a side view of the body portion of FIG. 1 with an attached head.

As can be seen from FIG. 3, a head (44) is attached to the body portion (4), and engages the output spindle (20) via a splined member (22). The interface surface (50) comprises a first linear section (52) remote from the handle (10) of the tool (2) and a second cylindrical section (54) adjacent to the handle (10).

Figure 4:
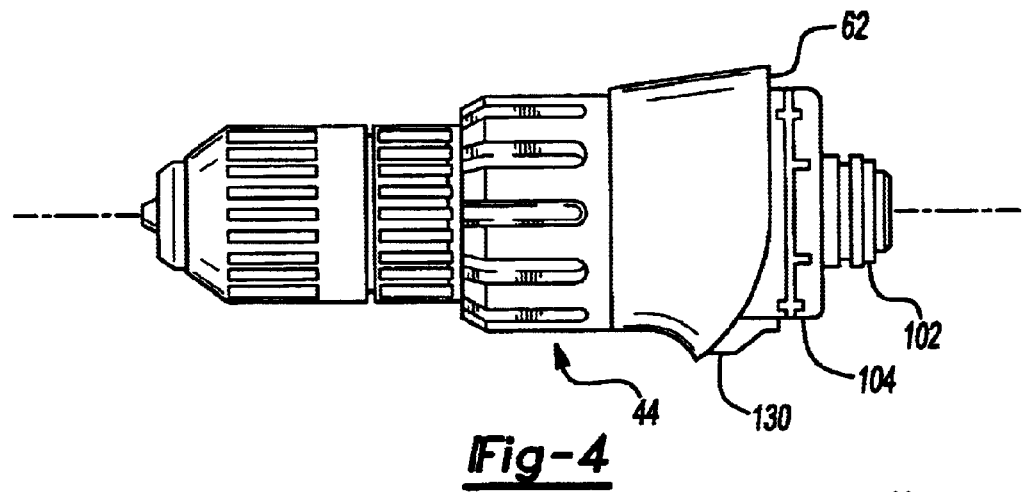
FIG. 4 shows a side view of a drill/driver mechanism for a drill, one of the plurality of heads for attachment to the body portion.

The head (44) as shown in FIG. 3 and FIG. 4 is a drill/driver head for a drill. This can be removed from the body portion (4) and replaced by an alternative head, for example a jigsaw (46) or a sander (48).

Figure 5:
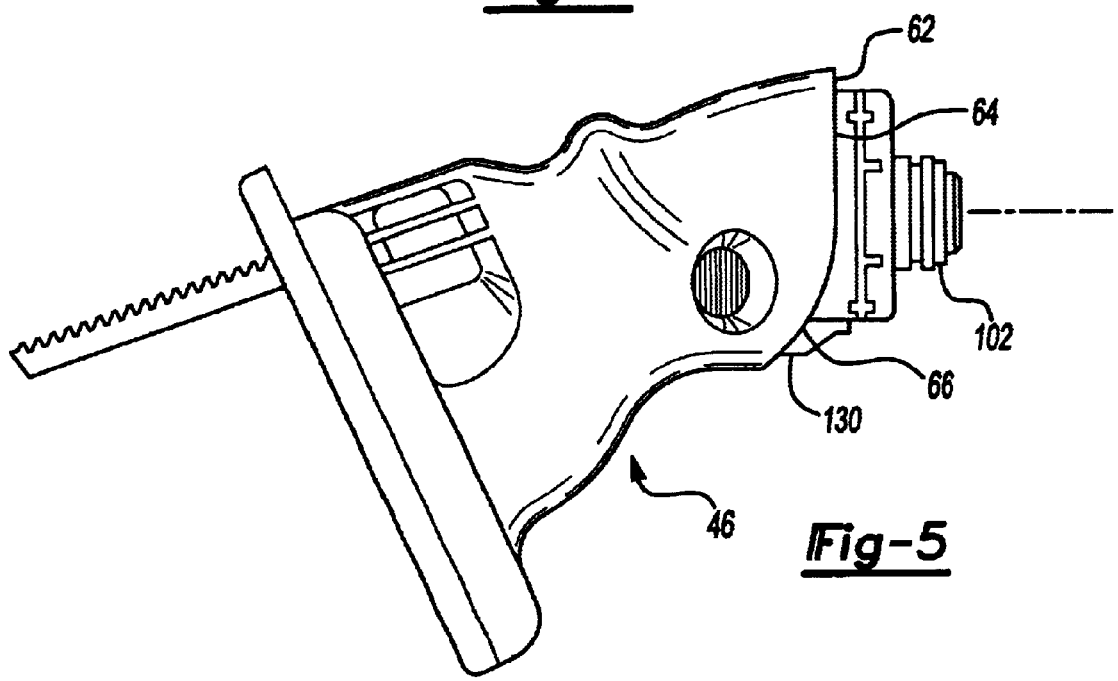
FIG. 5 shows an alternative attachment to FIG. 4, a jigsaw.
Figure 6:
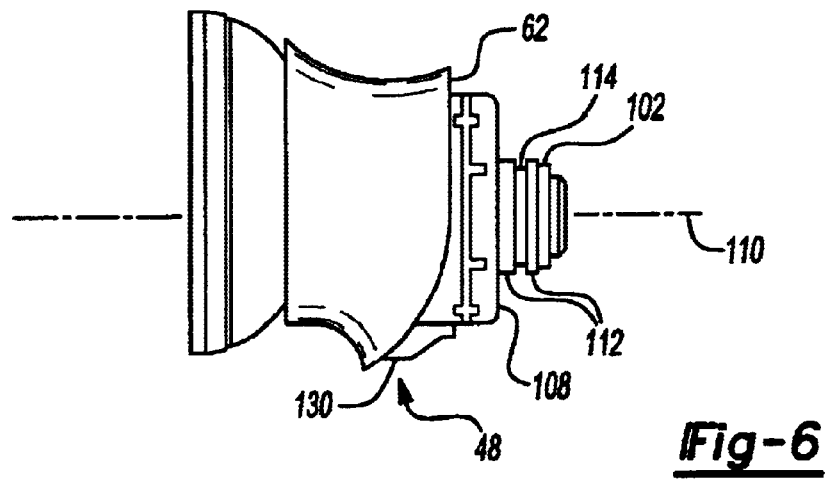
FIG. 6 shows a further attachment, a sander.
Figure 7:
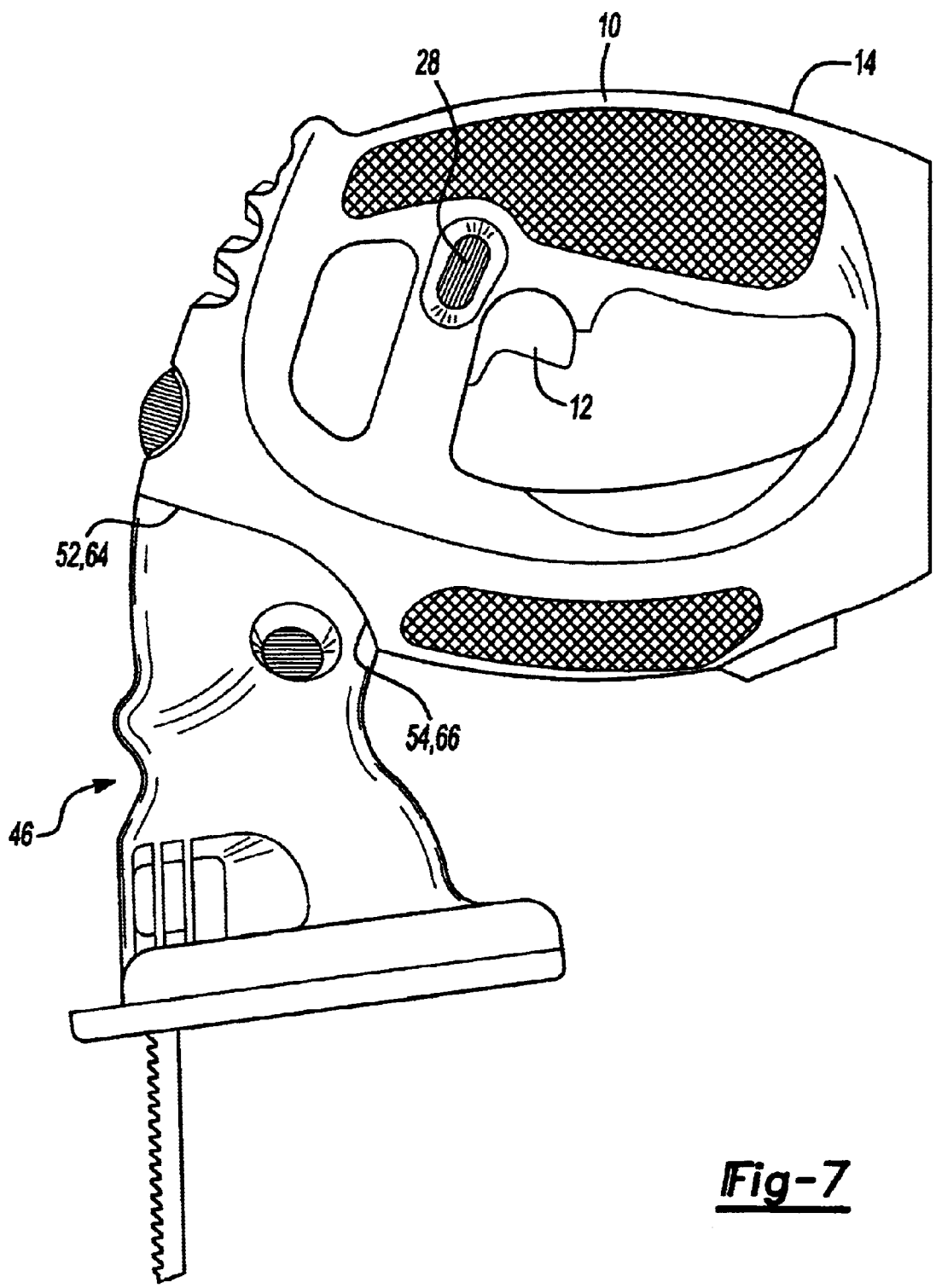
FIG. 7 shows a side view of the body portion of FIG. 1 with an attached jig saw head.
Figure 8:
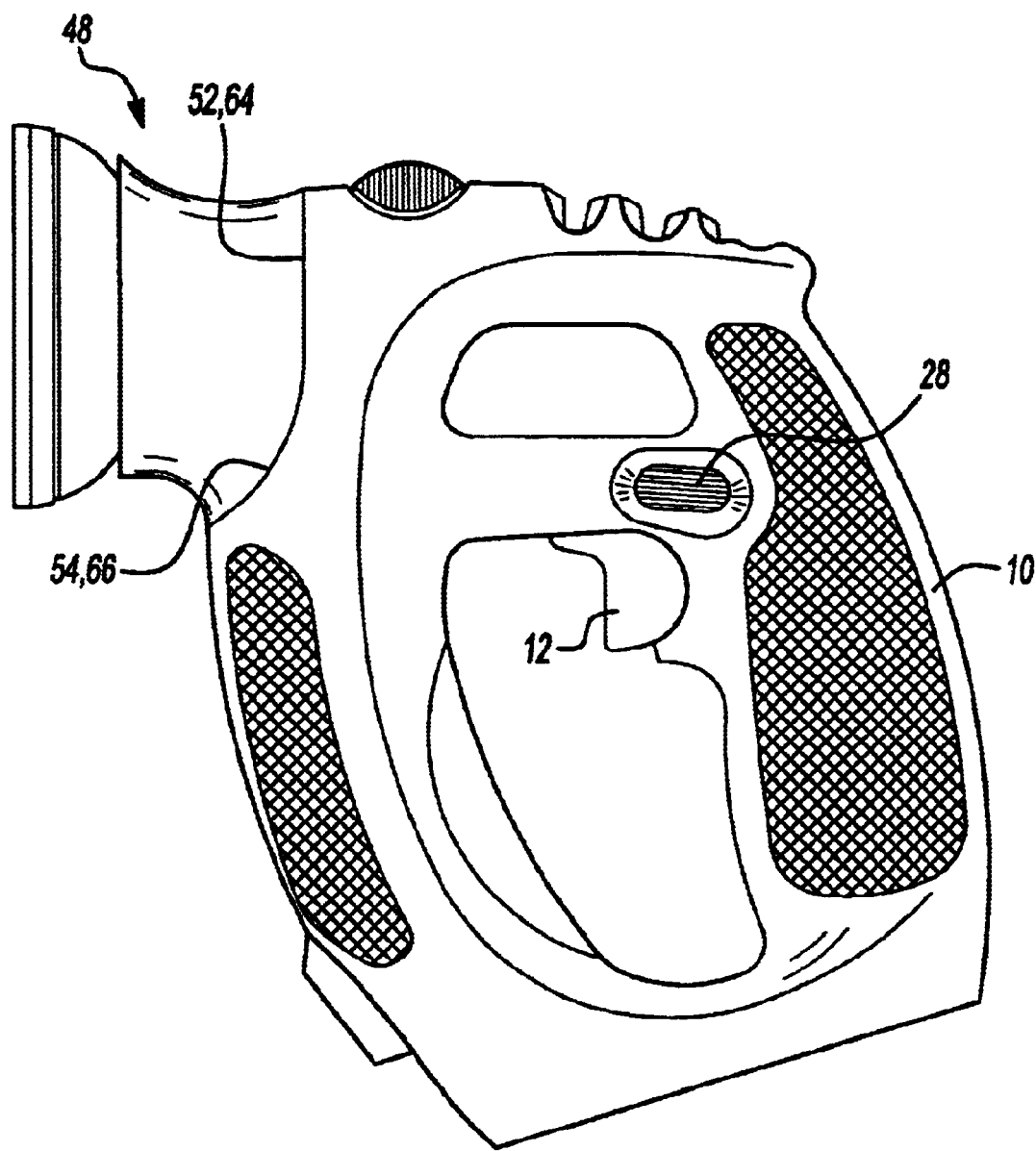
FIG. 8 shows a side view of the body portion of FIG. 1 with an attached sander head.

As can be seen from FIGS. 4, 5 and 6, each of the respective toolheads (44,46,48) each have a corresponding interface surface (62) again comprising a linear section (64) and a second cylindrical section (66) so that said interface surface (62) of each of the toolheads will co-operate exactly with the substantially identical interface surface (50) of the tool body, as shown in FIGS. 3, 7 and 8.

In addition, each of the toolheads as seen in FIGS. 4, 5 and 6 have a uniform connection system (102). This toolhead connection system (102) comprises a rearwardly extending cylindrical spigot (104) which is shaped so as to fit snugly within a corresponding cylindrical opening (106) of the body portion (4). As can be seen from FIG. 1, the cylindrical opening (106) of the body portion is defined by a series of inwardly directed ribs (107) forming a substantially cylindrical chamber. The cylindrical spigot (104) has a substantially flat circular rear wall (108) disposed about a head axis (110). Projecting rearwardly of this wall (108) so as to extend coaxial with the axis (110) is a second, substantially cylindrical and hollow spigot (102) having a diameter substantially less than the diameter of the spigot (108). This hollow spigot (102) has a series of exterior cylindrical ribs (112) which define an outer cylindrical recess (114).

Thus as the toolhead is brought into engagement with the body portion (4) the connection system (102) is inserted into the cylindrical opening (22) of the body portion (4) so that a toolhead axis (110) extends substantially co-axial with the axis of the output spindle (20). As the connection system (102) passes into the cylindrical opening (22) it will cause the hollow cylindrical spigot to pass through the aperture (18) so as to encompass the splined member (22), to effect engagement with a cooperating member (not shown) in the toolhead so as to operate said toolhead.

When the toolhead has been fully connected to the tool body (4) the interface surface (50) of the tool body (4) and the interface surface (62) of the toolhead will abut in co-operating engagement as seen in FIG. 3, 7 or 8, whereby the cylindrical spigot (108) is received in co-operating engagement with the cylindrical inner surface (106) of the body portion (4).

To restrain each toolhead in connection with the body portion (4), the body portion (4) is further provided with a resiliently biased locking mechanism. This locking mechanism comprises two resiliently biased spring wires (not shown) and disposed symmetrically about the axis of the splined member. As the spigot (102) passes into the aperture (18) of the body portion (4) the spigot (102) will engage the biased wires and deflect them out of the path of the cylindrical spigot (102) whereby continued insertion will them enable these resiliently deflected wires to encounter the cylindrical recess (114) of the spigot (102) and, by returning to the resiliently biased position, snap engage with this recess (114) to restrain the connection system (102) from further axial displacement. This locking mechanism is further provided with a conventional pushbutton whereby actuation of such a pushbutton will cause the two wires to be pushed apart in a conventional manner so as to move them out of engagement with the cylindrical recess (114) in the connection system (102) to thereby release the toolhead when required.

It will be further appreciated that each of the toolheads (44,46,48) further comprises a projection indicated generally as 130 extending from the cylindrical section (66) of each toolhead which is to be received in a co-operating recess (132) in the second cylindrical section (54) of the interface surface (50) of the tool body (4). Amongst other uses, this projection (130) serves to orientate the toolhead for connection with the tool body and helps restrain the toolhead from rotation about the axis when connected to the tool body. In use, the design of the interface surface (50/62) between the tool body (4) and the respective toolheads (44,46,48) allows for optimum performance of the tool irrespective of the particular function defined by the toolhead. Referring firstly to FIG. 3 when the drill/driver head has been attached to the tool body it will be understood by those skilled in the art that the majority of the static load transmitted through the interface (50/62) will be co-axial with respect to the motor and spindle (20) axis as is conventional for operation of a standard drill. In this situation the linear section (52) of the interface surface absorbs the majority of the load. Furthermore, the reaction torque generated by drilling and/or screwdriving is resisted by the co-operating second cylindrical sections (54/66) section of the interface since it will be appreciated that in the drilling mode a rotational torque will be applied from the output spindle of the tool to the toolhead which exerts a natural tendency to rotate such toolhead. However, the curved "cup and cone" effect of the curved section of the interface when the toolhead is locked in engagement with the tool body will resist such rotational force.

Referring now to FIG. 8, when the sander head (48) has been attached to the tool body in the manner discussed above, the loads applied through the tool body to the toolhead are generally lower than for drilling but are still predominantly co-axial with the linear interface absorbing the majority of the load transmitted through the joint. However, again the second cylindrical section (54) of the interface serves to resist any rotation of the toolhead resulting from the rotational torque generated by the output spindle.

However, when the jig saw head (46) is attached to the tool body (4) (FIG. 7) the forces exerted between the interface (50/62) are quite different in that as well as applying a downward force to keep the soleplate in accurate contact with the workpiece, the operator also has to apply an "urging" torque from the handle via the interface to make the saw blade move forwards through the workpiece in a conventional manner. In this situation the second cylindrical section (54) of the interface resists this urging torque to good effect, restraining the toolhead from any potential shearing effect along the interface which could result in undue stress being applied to the output spindle of the motor which could damage the tool. In addition, the increased interface pressure required to maintain the jig saw toolhead in connection with the workpiece (i.e. pushing the tool body downwardly into engagement with the workpiece) provides an additional benefit that any turning action imposed on the handle (as is conventional in the use of a jig saw to cut a curve surface) will be effectively transferred through the cylindrical section interface (54) to the cutting blade, this applied torque by the user being transmitted directly to the toolhead via this curved interface.

Finally, it will be appreciated that the asymmetrical nature of the interface of the tool body and the respective toolheads will assist the user in correctly aligning the various toolheads prior to the connection of the toolheads to the body.

What is claimed is:

1. A power tool comprising:
   a body portion defining a handle;
   a motor mounted within the body portion;
   a drive member driven the motor and defining an axis;
   the body portion defining an opening;
   a removable head received within the opening, the removable head operatively receiving the output member;

the body portion defining an attachment head interface abutting the removable head, the interface defining a rigid and substantially continuous surface having a first portion and a second portion, the first portion being generally disposed in a first plane and oriented generally perpendicular to the axis, the second portion being generally disposed in a second plane at an angle to the first plane, the first portion defining an upper part of the opening, the second portion extending downwardly and forwardly relative to the first portion and defining a second part, the first portion upwardly terminating at an upper surface of the body portion, the second portion downwardly terminating at a forward surface of the body portion.

2. The power tool of claim 1, wherein the first and second portions cooperate to completely surround the axis, the first and second portions circumferentially surrounding distinct segments about the axis.

3. The power tool of claim 1, wherein the first and second portions are both generally arcuate in a plane substantially perpendicular to the axis.

4. The power tool of claim 1, wherein the removable head has a cooperating surface for continuously mating with the continuous surface.

5. The power tool of claim 1, wherein the first portion is convexly curved.

6. The power tool of claim 1, wherein the removable head is a drill/driver head for a drill.

7. The power tool of claim 1, wherein the removable head is a jigsaw head.

8. The power tool of claim 1, wherein the removable head is a sander head.

9. The power tool of claim 1, wherein the first and second portions intersect at a smooth curve.

10. A power tool comprising:
a main body portion defining an opening;
a motor mounted within the main body portion;
an output member rotatably driven about an axis by the motor;
at least one removable head received with the opening, the at least one removable head operatively receiving the output member; and
the main body portion including a continuous interface surface about a periphery of the opening, the interface surface including a first portion and a second portion, the first portion being generally planar and oriented substantially perpendicular to the axis, the second portion being angled with respect to the first portions the first and second portions being rigid;
the at least one removable head having a cooperating rigid surface abutting the interface surface;
whereby the first and second portions are both engaged by the cooperating rigid surface of the at least one removable head through movement of the at least one removable head in a direction parallel to the axis.

11. The power tool of claim 10, wherein the at least one removable head includes a plurality of removable heads.

12. The power tool of claim 10, wherein the second portion is concavely curved in a vertical plane.

13. The power tool of claim 10, wherein the second portion forwardly extends from the first portion.

14. The power tool of claim 10, wherein the second portion is a lower portion and the first portion is an upper portion.

15. The power tool of claim 10, wherein the at least one removable head includes a jigsaw head.

16. The power tool of claim 10, wherein the at least one removable head includes a drill/driver head for a drill.

17. The power tool of claim 10, wherein the at least one removable head includes a sander head.

18. A power tool comprising:
a body portion defining a handle;
a motor mounted within the body portion;
a drive member driven the motor and defining an axis;
the body portion defining an opening;
a removable head received within the opening, the removable head operatively receiving the output member;
the body portion defining an attachment head interface matingly abutting the removable head, the interface defining a rigid and substantially continuous surface having a first portion and a second portion, the continuous surface having a non-circular shape which prevents relative rotation between the body portion and the tool head.

19. The power tool of claim 18, wherein the removable head engages the rigid and substantially continuous surface in a direction parallel to the axis.

20. A power tool comprising:
a body portion defining an opening;
a motor mounted within the main body portion;
an output member rotatably driven about an axis by the motor;
a removable head at least partially received in the opening, the removable head operatively receiving the output member;
the opening being bordered by a flange portion and a confronting portion, the flange portion being formed in at least two distinct planes, a first one of the planes being disposed generally perpendicular the axis of the output member, a second one of the planes being disposed at an angle relative to the axis of the output member so as to intersect the first one of the planes, the confronting portion being sized to receive;
the removable head having a cooperating surface that continuously abuts the flange portion.

\* \* \* \* \*